Patented May 13, 1952

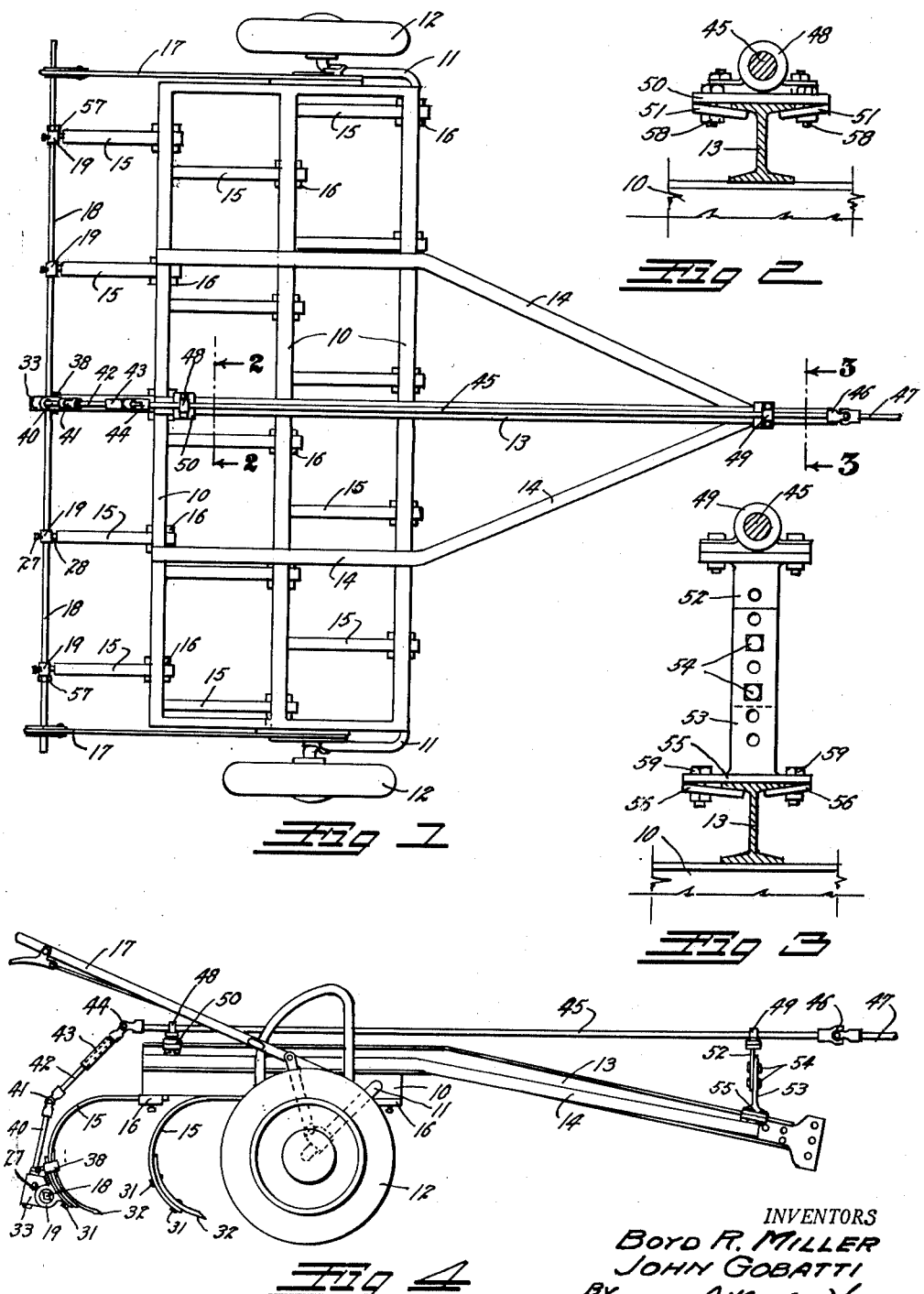

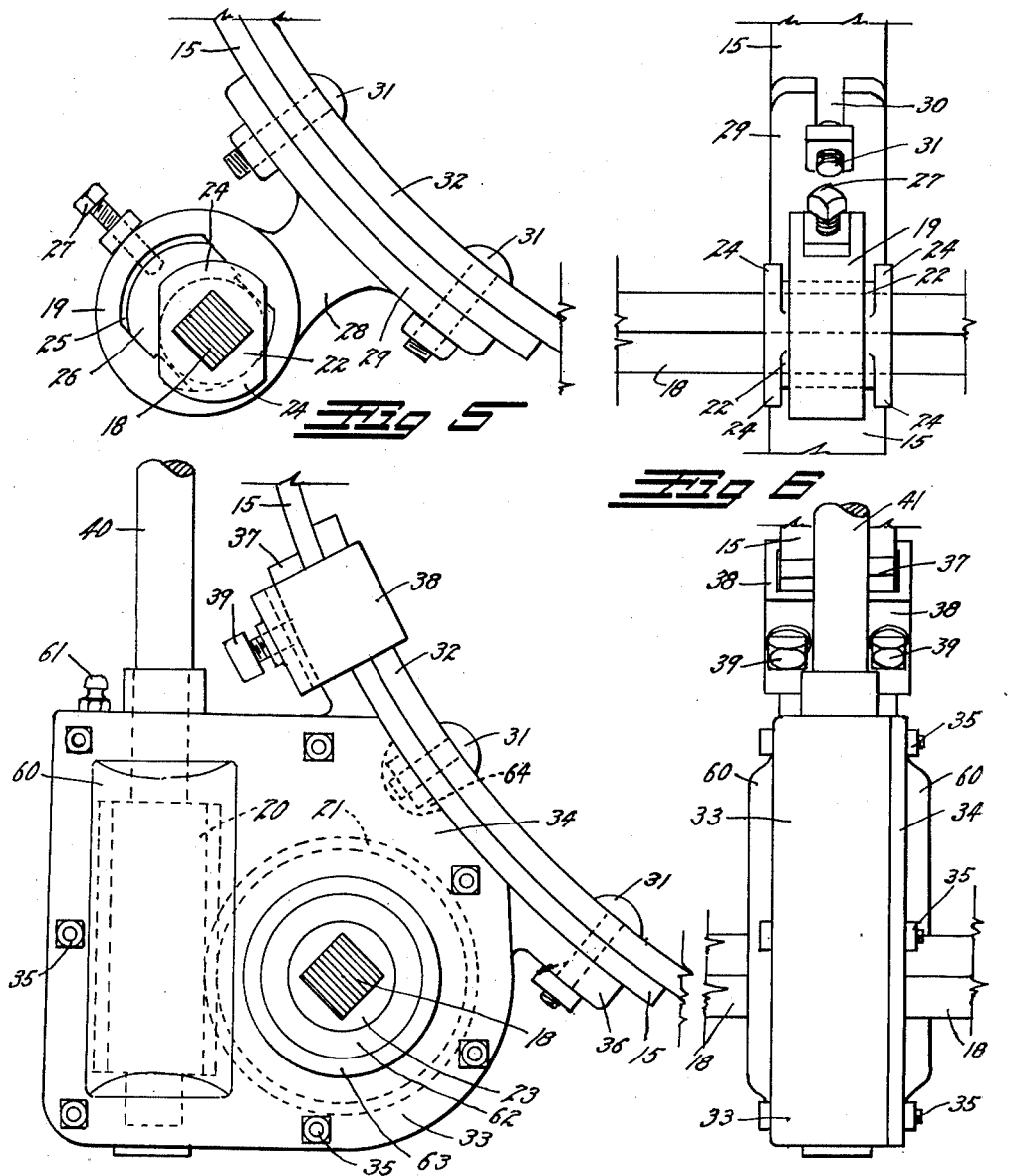

2,596,270

UNITED STATES PATENT OFFICE 2,596,270

ROD WEEDER ATTACHMENT FOR CULTIVATORS

Boyd R. Miller and John Gobatti, Pueblo, Colo.

Application March 21, 1951, Serial No. 216,758

4 Claims. (Cl. 97—42)

This invention relates to a rod weeding attachment for cultivators and harrows of the spring tine-toothed types, and has for its principal object the provision of a simple and highly efficient rod weeding attachment which can be quickly and easily applied to a conventional spring tine-toothed harrow or cultivator without change in the latter, and by means of a simple wrench.

Another object of the invention is to provide a rod weeding attachment which can be applied to, and which will flex with, the resilient tines of the harrow without interfering with the efficiency of the weeder or the tines, and without binding the bearings of the weeder rod.

A further object is to provide efficient and economical means for driving a rod weeder from the conventional power take-off of a tractor.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of a conventional spring tine-toothed harrow or cultivator, illustrating the improved rod weeder attachment applied thereto;

Fig. 2 is an enlarged, detail section, taken on the line 2—2, Fig. 1;

Fig. 3 is a similar detail section, taken on the line 3—3, Fig. 1;

Fig. 4 is a side view of the harrow or cultivator with the rod weeding attachment in place thereon;

Fig. 5 is an enlarged side view of a weeder rod bearing as used in the improved attachment;

Fig. 6 is a rear view of the bearing of Fig. 5;

Fig. 7 is a similarly enlarged side view of a gear box employed in the improved attachment; and Fig. 8 is a rear view thereof.

In Figs. 1 and 4 parts of a conventional spring tine-toothed cultivator or harrow are designated by numeral as follows: cultivator frame 10; crank axles 11; supporting wheels 12; I-beam tongue 13; tongue frame 14; spring tines 15; tine clamps 16; lifting levers 17; replaceable tine points 32; and point attachment bolts 31.

The improved rod weeder attachment is designed to be attached to the tongue 13 and to the rear set of tines 15. The attachment employs a flexible, rectangular weeder rod 18 supported from the tines 15 in bearing rings 19 and driven from a worm and worm gear, the positions of the latter being indicated in broken line at 20 and 21, respectively, in Fig. 7.

The weeder rod 18 is slidably passed through bearing spools 22 carried by the bearing rings 19, and through a rectangular opening in a hub 23 formed on the worm gear 21. The spools 22 have rectangular, axial passages for slidably receiving the rod 18 and are provided at their extremities with oppositely extending retaining flanges 24 which retain the spools in the rings 19. The rings contain angularly positioned, elongated bearing openings 25 through which the flanges 24 of the spools may be passed in order to insert the latter into the rings. After the spools are inserted in the rings, they are retained in place therein by means of hardened steel bearing shoes 26 having concave bottoms which fit partially around the spools 22. The bearing shoes are brought loosely against the spools by means of set screws 27, which are threaded through the rings 19, and terminate in sockets in the bearing shoes 26, so that the spools may tilt within the confines of the rings.

Each of the rings 19 is supported from a bracket arm 28 extending from a curvated foot 29. The foot 29 extends at both extremities beyond the bracket arm, and the extremities are slotted, as indicated at 30, to receive the point attachment bolts 31 of the conventional tine 15. The bolts 31 are standard equipment of the cultivator and need only to be loosened to attach the feet 29 of the rod bearings in place. Endwise movement of the weeder rod is prevented by means of set collars 57 positioned outside the endmost bearing spools 22.

The worm 20 and the worm gear 21 are conventional and are contained within a gear box 33, one side of which is closed by means of a cover plate 34 held in place thereon by means of clamping bolts 35. The gear box and cover plate are bulged, as shown at 60, to accommodate the worm 20, and the former is provided with suitable lubrication fittings 61. The hub 23 of the worm gear 21 is mounted in suitable annular bearings 62 held in bearing bosses 63 in the gear box and its cover plate 34. The gear box is formed with a lower foot 36 and an upper foot 37. The foot members 36 and 37 and the gear box 33 are curvated to provide a continuous, curved attachment surface which corresponds to the natural curve of the cultivator tines 15. The gear box is fitted against the back of the middle rear tine of the cultivator, and the lower foot 36 is attached to the back of the tine by means of one of the lower point attachment bolts 31. The upper point attachment bolt is not disturbed and rests in a cavity formed in the arcuate surface of the gear box, as indicated in broken line at 64 in Fig. 7. The upper foot 37 is clamped to the tine by means of a hollow, rectangular clamp sleeve 38 carrying set screws 39. The sleeve 38 surrounds the foot 37, the tine 15, and the tine point 32, and is clamped thereto by means of the set screws 39, which engage the back of the foot 37.

The worm 20 is carried on and driven from a worm drive shaft 40 which is journalled in the gear box 33 in any conventional manner. The worm drive shaft 40 terminates at its upper extremity in a first universal joint 41, from which a two-section telescoping shaft 42 extends. One section of the telescoping shaft carries a sliding sleeve 43, into which the other section is slidably fitted to allow longitudinal extension of the shaft. The latter shaft section and the axial opening in the sleeve 43 are preferably rectangular in cross-section so that, although they are free to slide on each other, they cannot rotate with relation to each other.

The telescoping shaft 42 terminates at its upper extremity in a second universal joint 44 by means of which it is connected to an elongated power shaft 45. The power shaft terminates at its forward extremity in a third universal joint 46, from which a power take-off shaft 47 extends to the conventional power take-off of a towing tractor (not shown).

The power shaft 45 is supported in a rear pillow block 48 and a front pillow block 49. The rear pillow block is mounted on a saddle plate 50, which is clamped to the upper flanges of the I-beam tongue 13 by means of clamp plates 51 and clamp bolts 58 (see Fig. 2). The front pillow block 49 is supported on an upper post bracket member 52 which is clamped to a lower post bracket member 53 by means of suitable clamp bolts 54. The lower post bracket member 53 arises from a second saddle plate 55, which is clamped to the upper flanges of the I-beam tongue 13 by means of suitable clamp plates 56 and clamp bolts 59. In the conventional cultivator or harrow of this type, the forward extremity of the tongue 13 is inclined downwardly. The bracket members 52 and 53 are provided with a plurality of aligned, spaced-apart bolt holes, as shown in Fig. 3, to allow the bolts 54 to be positioned to provide the proper vertical adjustment to align the drive shaft 45 with any incline of the tongue. The weeder rod rotates in a clockwise direction, as viewed in Fig. 2.

It can be seen that as the frame 10 is lowered, through the medium of the levers 17, the rod 18 will lower simultaneously therewith so as to travel in any desired plane below or above the ground level, so that it will entangle weeds and weed roots to pull, spin, and throw the weeds from the ground.

Flexure of the tines 15 simply results in flexure of the weeder rod 18. The latter rod is free to flex in the bearing rings 19, since the spools 22 are loosely fitted therein and can swing with the bending movements of the rod. The tines may flex freely, since all vertical movements are accommodated by the telescoping shaft 42. Therefore, the weeder rod is free to follow all movements of the flexible tines 15 without clamping or interfering with rotation of the rod. The rod bearings and the gear box are no wider than the tines 15, so that they do not project beyond the sides of the tines to create drag.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A rod weeder attachment for spring tine-toothed cultivators having a plurality of transversally aligned, flexible, arcuate tines, comprising: a plurality of bearing members having curvated surfaces corresponding to the curvature of said tines; means attaching said bearing members to said tines in horizontally aligned relation; a rotatable spool mounted in each bearing member and having a rectangular axial opening; a rectangular weeder rod extending through the openings of the spools of all of the bearing members; a gear hub having a rectangular, axial bore fitted over said weeder rod intermediate the extremities of the latter; a gear box enclosing said gear hub, said gear box having a convex, arcuate surface corresponding to the curvature of one of said tines; means for securing the arcuate surface of said gear box against one of said tines; and means for rotating said gear hub.

2. A rod weeder attachment for spring tine-toothed cultivators having a plurality of transversally aligned, flexible, arcuate tines, comprising: a plurality of bearing members having curvated surfaces corresponding to the curvature of said tines; means attaching said bearing members to said tines in horizontally aligned relation; a rotatable spool mounted in each bearing member and having a rectangular axial opening; a rectangular weeder rod extending through the openings of the spools of all of the bearing members; a gear hub having a rectangular, axial bore fitted over said weeder rod intermediate the extremities of the latter; a gear box enclosing said gear hub, said gear box having a convex, arcuate surface corresponding to the curvature of one of said tines; a downwardly extending foot on said gear box; means securing said foot to a tine; an upwardly extending foot on said gear box; a sleeve surrounding the latter foot and said tine; set screws threaded through said sleeve and clamping the upper foot against the tine; and means for rotating said gear hub.

3. A rod weeder attachment for spring tine-toothed cultivators having a plurality of transversally aligned, flexible, arcuate tines, comprising: a plurality of bearing members having curvated surfaces corresponding to the curvature of said tines; means attaching said bearing members to said tines in horizontally aligned relation; a rotatable spool mounted in each bearing member and having a rectangular axial opening; a rectangular weeder rod extending through the openings of the spools of all of the bearing members; a gear box containing a pair of power transmission gears, said gear box being fitted over said weeder rod at the middle thereof; a hub on one of said transmission gears and having a rectangular opening receiving said weeder rod; means clamping said gear box to one of said tines; a drive shaft extending upwardly from the gear box and carrying the other transmission gear; a power shaft extending longitudinally and horizontally of said cultivator; a telescoping shaft extending between said drive shaft and said power shaft; universal joints connecting said shafts; and means for rotating said power shaft.

4. A rod weeder attachment for cultivators as described in claim 3 having a rear bearing for said power shaft; a forward bearing for said power shaft; means for detachably securing said bearings to said cultivator; and means for varying the height of the forward bearing from said cultivator.

BOYD R. MILLER.
JOHN GOBATTI.

REFERENCES CITED

The following references are of record in the file of this patent:

UNITED STATES PATENTS

| Number | Name | Date |
| --- | --- | --- |
| 2,125,359 | Scarlett | Aug. 2, 1938 |
| 2,528,270 | Fundingsland | Oct. 31, 1950 |